Feb. 28, 1950

F. M. REDMON, SR 2,499,280

COMBINED PEDAL FOR MOTOR VEHICLES

Filed Aug. 7, 1946

INVENTOR.
FRANK M. REDMON, SR
BY
Lockwood Goldsmith & Galt
ATTORNEYS.

Patented Feb. 28, 1950

2,499,280

UNITED STATES PATENT OFFICE 2,499,280

COMBINED PEDAL FOR MOTOR VEHICLES

Frank M. Redmon, Sr., West Newton, Ind., assignor of one-third to Robert E. Cline and one-third to James H. Cardinal, both of Indianapolis, Ind.

Application August 7, 1946, Serial No. 688,813

4 Claims. (Cl. 74—478)

This invention relates to a vehicle pedal control system.

The chief object of this invention is to provide a dual operator for two independent controls of a three control system of an automobile or the like.

The foregoing objective, when accomplished by the present invention, has certain advantages. For example, when applied to the throttle or fuel control and the brake control, removal of the foot to decelerate by fuel reduction and braking is not necessary, thus saving from a fraction of a second to a few seconds. For a one-legged driver the invention is particularly advantageous for if the driver has a right leg he can (for American cars) control both fuel and brakes without removal of the foot from a common pedal, the clutch control necessarily being effected by shifting that single foot to the clutch foot pedal from the dual pedal, the emergency or hand brake being used for holding the vehicle while starting on a decline or incline. When the one-legged driver has but a left leg (for American cars) the common pedal structure may be applied to both clutch and brake controls or throttle and clutch controls as desired. In either of the last two instances the time having factor initially mentioned obviously is not included.

Since throttle control and brake control, in a sense, are opposed, the invention is herein so illustrated and described.

The chief feature of the present invention resides in the intermediately fulcrumed dual foot pedal and its operative association with two independent controls of a self propelled vehicle.

Other objects and features of the invention will be set forth more fully hereinafter.

The full nature of the invention will be understood from the accompanying drawings and the following description and claims:

Figure 1:
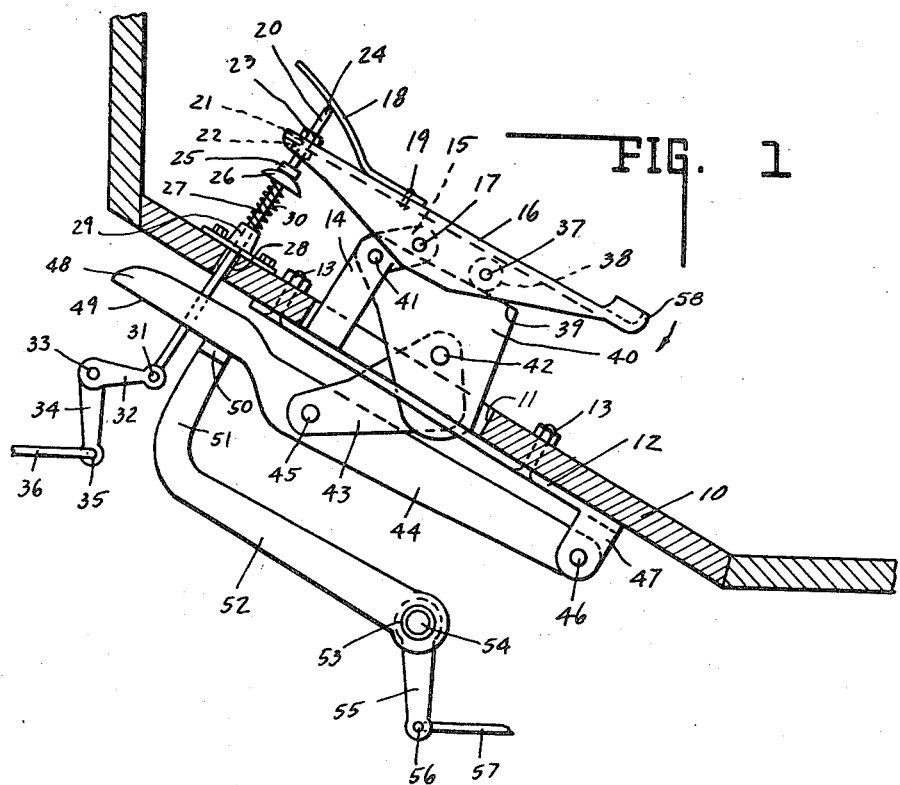
Fig. 1 is a sectional view of a portion of a vehicle and, more particularly, the toe board portion, the invention being shown in elevation and as applied to the fuel control system and the braking system.

In Fig. 1, 10 indicates the conventional toe board structure of an automobile. It is apertured at 11 and associated with that aperture is a plate 12 that is attached to the toe board and carried thereby as at 13.

Directed outwardly from said plate 12 and projecting through toe board aperture 11 are the ears 14 which include upward rearward extensions 15. A U-sectioned foot pedal 16 straddles said ears and is pivoted thereon as at 17.

The upper and forward end of said pedal has secured to it an upwardly and forwardly directed resilient plate or tongue structure 18 secured at its lower rearward end as at 19 to the pedal structure.

An adjusting bolt 20 extends through the forward end of the pedal, as at 21, and is locked between nuts 22 and 23 in the adjusted position, one end of the bolt as at 24 bearing on the resilient tongue 18 and the other end, and this is the head end, 25 of the bolt being disposed downwardly for contact with the head 26 of the throttle control rod 27 that extends through aperture 28 in the toe board and is slidably supported by bracket 29 thereabove.

Interposed between the bearing 29 and the head 26 and concentric with the rod 27 is a coil spring 30 that normally constrains the rod upwardly and rearwardly and into contact with the head 25 of the adjusting bolt.

The lower end of the rod 27 is pivotally connected as at 31 to one end 32 of a bell crank structure pivoted at 33 and having arm 34 pivotally connected at 35 to a control rod 36 operatively connected to the fuel control system of the engine for regulating the fuel supply thereof.

The parts are shown in the neutral or low idle position. When foot pressure is applied to the pedal 16 to depress the same downwardly and forwardly, the throttle control rod 36 is projected to the left, see Fig. 1, for increasing fuel supply to the engine.

Release of foot pressure on the pedal permits the pedal to return to the neutral position and the fuel control to return to or toward the low idle position.

Pivotally mounted within the confines of the foot pedal structure and rearwardly of the pivot 17 thereof, as at 37, is a ball or roller bearing structure 38 and the same is disposed above the transverse portion 39 of a lever having the ears 40 depending therefrom, the ears at the upper forward portion being suitably pivoted as at 41 to the ears 14 aforesaid of the supporting plate.

The two ears 40 project through the slot 11 in the toe board and herein at 42 pivotally support the links 43 which straddle an arm 44 and are pivotally connected to said arm as at 45.

The lower rearward end of the arm 44 is pivoted as at 46 between a pair of ears 47 carried by the plate 12. The upper forward end of the arm 44 is disposed in slightly offset relation, as indicated at 48, and is provided with a lateral extension 49 on its under face.

This lateral extension 49 is juxtapositioned to a lateral extension 50 carried by an angular extension 51 of the brake control lever 52 rigid with sleeve 53 rotatable on shaft 54. Also rigid with the sleeve is the usual arm means 55 pivotally connected at 56 to the means 57 connected to the braking system.

The braking system is normally constrained to non-brake applying position and neither the system nor the constraint is herein disclosed since it may take various forms well known in the industry. It is sufficient to state, however, that the parts illustrated in Fig. 1 are shown in the non-braking position.

When braking is desired the lower rearward end of the dual pedal structure 16 is depressed by heel pressure application with the result that the anti-friction bearing structure 38 rolls on the plate 39 as the pedal and the ears are similarly depressed. This in turn forces the lever member 44 downwardly so that the lever member 52 with its arm 55 is rotated counter-clockwise for brake application in opposition to the normal constraint previously mentioned.

Upon release of the heel pressure from the dual pedal structure the constraining means, not shown herein and in the brake system, normally returns all of the parts to the neutral position, as it were, corresponding to non-braking position and this positioning of the parts is shown in Fig. 1.

To prevent the foot from slipping from the dual pedal structure a heel guard 58 is provided at the lower rearward end of the dual pedal 16.

When the foot is positioned properly upon the dual pedal and the tongue 18 is adjusted for minimum foot strain, toe pressure and release effects throttle control while heel pressure and release thereof effects brake control. Thus one foot can regulate vehicle speed and regulate deceleration, in other words, acceleration and deceleration, by merely rocking the foot without foot removal and by rocking the pedal.

Figure 2:
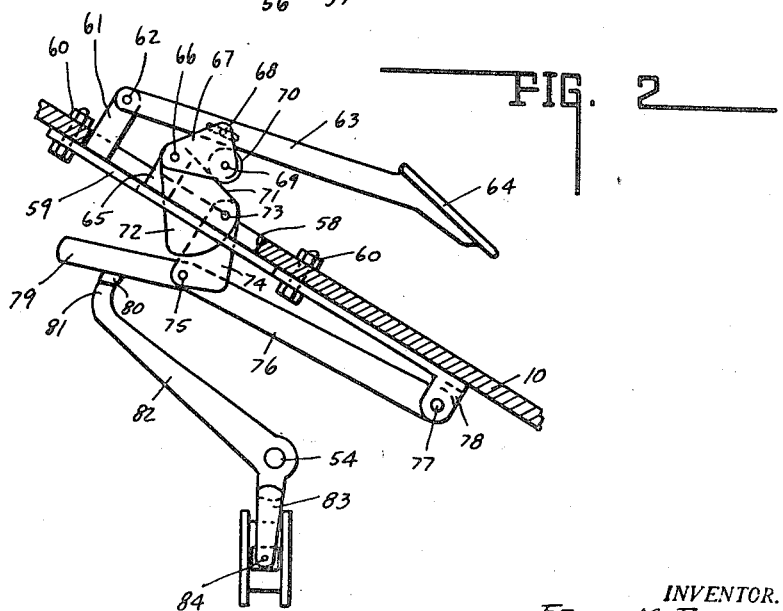
Fig. 2 is a similar view of the clutch control system.

Reference will now be had to Fig. 2. In this figure the toe board 10 is similarly apertured as at 58 and a plate 59 is suitably secured to the toe board, as at 60. Upon upwardly projecting ears 61, in a sense corresponding to ears 14, there is pivoted at 62 a pedal arm 63 terminating in a foot engageable portion 64.

Pivoted upon another pair of ears 65 carried by plate 59 and at 66 is a pair of link members 67 which, in turn, are pivoted at 68 upon member 63 and pivotally support, as at 69, a ball or roller bearing structure 70, the latter engaging the surface 71 of the member 72 that is pivotally supported at 66 upon the ears 65.

The member 72 is pivoted at 73 to the member 74 pivoted at 75 upon the lever member 76, in turn pivoted at 77 in the lower rearward ears 78 of the plate 59. The forward angular extension 79 of this lever 76 is disposed above the transverse portion 80 and the angular extension 81 of the clutch lever 82, the latter being pivoted as shown upon the shaft 54 and the arm 83 rigid with the arm 82 is adapted for connection as at 84 to the clutch control mechanism, the arm 83 constituting the clutch shifter yoke portion thereof.

When the clutch pedal 63—64 is depressed by foot pressure applied thereto, the roller 70 causes the member 72 to tilt clockwise on pivot 66, in turn depressing or effecting counter-clockwise rotation of lever 76 in turn effecting similar rotation of the lever 82, etc., and to a corresponding degree.

For vehicle operation the left foot (in American cars) is disposed adjacent the clutch pedal 63—64 so it may be available for clutch operation as well as foot switch operation when light control is desired, since most automobiles now have a foot switch positioned adjacent the clutch pedal.

The other or right foot is positioned upon the dual lever structure, shown in Fig. 1, and the same is operated in accordance with the desire of the operator by toe pressure, heel pressure, or substantially no pressure when neither acceleration or deceleration is desired other than coasting of the vehicle with the clutch engaged.

If coasting without engine braking is desired the clutch pedal 63—64 is depressed and the momentum of the vehicle as well as gravity, if the vehicle be descending a hill, will permit forward coasting travel of the vehicle.

While the invention has been illustrated and described in great detail in the drawings and foregoing description, the same is to be considered as illustrative and not restrictive in character.

The several modifications described herein as well as others which will readily suggest themselves to persons skilled in this art, are all considered to be within the broad scope of the invention, reference being had to the appended claims.

The invention claimed is:

1. A pedal controlled structure including a foot operable pedal pivotally mounted for clockwise tilting, an actuatable lever, the latter being adapted for connection to a vehicle control mechanism and rotatable counter-clockwise proportional to pedal rotation and normally constrained in the clockwise direction, a lever member similarly disposed with respect to the first mentioned lever and positioned thereabove and having the adjacent ends operatively engaged sequentially, link means pivotally connected together and having one end pivotally connected to the second mentioned lever between its pivotal support and the engagement and the other end pivotally supported adjacent the pedal, and bearing means operatively supported and actuated by the pedal and engaging the link means for first mentioned lever operation proportional to pedal operation and reverse thereof.

2. Structure as defined by claim 1 characterized by the bearing means being pivotally supported upon the pedal structure.

3. Structure as defined by claim 1 characterized by bearing means being of anti-friction type and having rolling contact with the link means.

4. Structure as defined by claim 1 characterized by the pedal being pivoted intermediate its ends and means associated with said pedal and disposed adjacent one end thereof for operation thereby when the pedal is tilted in one direction from a neutral position, tilting in the opposite direction of the other end thereof effecting tilting of the first mentioned lever as aforesaid.

FRANK M. REDMON, Sr.

REFERENCES CITED

The following references are of record in the file of this patent:

UNITED STATES PATENTS

| Number | Name | Date |
|---|---|---|
| 1,248,592 | Anderson | Dec. 4, 1917 |
| 1,303,956 | Pollak | May 20, 1919 |
| 1,449,395 | Goetz | Mar. 27, 1923 |
| 1,454,258 | Adams | May 8, 1923 |
| 1,527,151 | Davis | Feb. 17, 1925 |
| 1,535,866 | Sears | Apr. 28, 1925 |
| 1,711,712 | Yost | May 17, 1929 |
| 1,868,265 | White | July 19, 1932 |
| 1,990,828 | Jarvis | Feb. 12, 1935 |
| 2,125,952 | Perry | Aug. 9, 1938 |
| 2,280,859 | Siesennop | Apr. 28, 1942 |
| 2,352,104 | Kennedy | June 20, 1944 |

FOREIGN PATENTS

| Number | Country | Date |
|---|---|---|
| 476,635 | Germany | May 24, 1929 |